US012811427B2

(12) United States Patent
Takagi

(10) Patent No.: US 12,811,427 B2
(45) Date of Patent: Nov. 24, 2026

(54) STORAGE BATTERY CONTROL DEVICE AND STORAGE BATTERY CONNECTION CONTROL DEVICE

(71) Applicant: YAZAKI CORPORATION, Tokyo (JP)

(72) Inventor: Youko Takagi, Susono (JP)

(73) Assignee: YAZAKI CORPORATION, Tokyo (JP)

( * ) Notice: Subject to any disclaimer, the term of this patent is extended or adjusted under 35 U.S.C. 154(b) by 784 days.

(21) Appl. No.: 18/336,935

(22) Filed: Jun. 16, 2023

(65) Prior Publication Data

US 2024/0022103 A1 Jan. 18, 2024

(30) Foreign Application Priority Data

Jul. 12, 2022 (JP) ................................ 2022-111648

(51) Int. Cl.

| | |
|---|---|
| ***H02J 7/94*** | (2026.01) |
| ***H02J 7/44*** | (2026.01) |
| ***H02J 7/50*** | (2026.01) |
| ***H02J 7/80*** | (2026.01) |
| ***H02J 7/90*** | (2026.01) |

(52) U.S. Cl.

CPC .................. *H02J 7/94* (2026.01); *H02J 7/44* (2026.01); *H02J 7/50* (2026.01); *H02J 7/80* (2026.01); *H02J 7/977* (2026.01)

(58) Field of Classification Search

CPC ...... H02J 7/94; H02J 7/50; H02J 7/977; H02J 7/44; H02J 7/80

USPC .......................................................... 320/134

See application file for complete search history.

(56) References Cited

U.S. PATENT DOCUMENTS

| | | | | |
|---|---|---|---|---|
| 11,322,966 | B1 | 5/2022 | Tian | |
| 2011/0127964 | A1 | 6/2011 | Nishida et al. | |
| 2011/0279085 | A1 | 11/2011 | Shigemizu et al. | |
| 2022/0045524 | A1* | 2/2022 | Syouda | H02J 7/54 |
| 2022/0271538 | A1* | 8/2022 | Tian | H02J 7/56 |

FOREIGN PATENT DOCUMENTS

| | | | |
|---|---|---|---|
| JP | 2003-244854 | A | 8/2003 |
| JP | 2010-45923 | A | 2/2010 |
| JP | 2010-141970 | A | 6/2010 |
| JP | 2020-156200 | A | 9/2020 |
| JP | 2022-29299 | A | 2/2022 |

* cited by examiner

*Primary Examiner* — Nathaniel R Pelton

(74) *Attorney, Agent, or Firm* — KENEALY VAIDYA LLP

(57) ABSTRACT

A system controller acquires information on states of a plurality of storage battery strings, and based on the information, transmits bypass control information for controlling bypass switch units to string controllers. The plurality of string controllers control power converters of the corresponding storage battery strings according to charge and discharge power values or charge and discharge current values of the storage battery strings set by the system controller, and control the bypass switch units of the corresponding storage battery strings according to the bypass control information transmitted from the system controller.

9 Claims, 2 Drawing Sheets

STORAGE BATTERY CONTROL DEVICE AND STORAGE BATTERY CONNECTION CONTROL DEVICE

CROSS-REFERENCE TO RELATED APPLICATIONS

This application is based on and claims priority under 35 USC 119 from Japanese Patent Application No. 2022-111648 filed on Jul. 12, 2022, the contents of which are incorporated herein by reference.

TECHNICAL FIELD

The present invention relates to a storage battery control device and a storage battery connection control device.

BACKGROUND ART

There is known a power storage system including a plurality of storage battery strings connected in parallel and a plurality of power converters provided respectively for the storage battery strings (for example, see Patent Literature 1). In the power storage system disclosed in Patent Literature 1, the storage battery string includes a plurality of storage battery modules connected in series, and the power converter converts an output of the storage battery string into a set voltage of a load supply bus under the control of a controller.

As a power storage system including a plurality of storage battery strings connected in parallel, there is known a power storage system including a plurality of bypass switch units provided respectively for a plurality of storage battery modules connected in series, and a plurality of string disconnection switches provided respectively for the storage battery strings (for example, see Patent Literature 2). The bypass switch unit switches the storage battery module between a connected state and a bypassed state under the control of a controller. The string disconnection switch switches the storage battery string between a connected state and a disconnected state under the control of the controller.

CITATION LIST

Patent Literature

Patent Literature 1: JP2020-156200A
Patent Literature 2: JP2022-29299A

SUMMARY OF INVENTION

A large-scale power storage system including a plurality of power converters, a plurality of bypass switch units, and a plurality of string disconnection switches is assumed. In this assumption, when a large number of power converters and a large number of bypass switch units are controlled by one controller, a processing load on the controller is excessive. On the other hand, when the large number of power converters and the large number of bypass switch units are controlled by a plurality of controllers provided respectively for the storage battery strings in a shared manner, cooperative control among the storage battery strings is difficult.

The present invention has been made in view of the above circumstances, and an object thereof is to provide a storage battery control device and a storage battery connection control device capable of ensuring processing capacity even in a large-scale power storage system and implementing cooperative control among storage battery strings.

A storage battery control device of the present invention controls a power storage system including a plurality of storage battery strings connected in parallel to one another. The storage battery string includes a plurality of storage batteries connected in series, a bypass circuit that bypasses the storage battery, and a power converter that converts input and output power of the storage battery string. The storage battery control device includes a plurality of first control devices provided respectively for the storage battery strings; and a second control device communicably connected to the plurality of the first control devices and configured to set charge and discharge power values or charge and discharge current values of the storage battery string. The first control device or the second control device controls the power converter of the corresponding storage battery string according to the charge and discharge power values or the charge and discharge current values of the storage battery string set by the second control device, the second control device acquires information on states of the plurality of storage battery strings, and transmits bypass control information for controlling the bypass circuit to the first control device based on the information, and the first control device controls the bypass circuit of the corresponding storage battery string according to the bypass control information transmitted from the second control device.

Further, a storage battery control device of the present invention is used in a power storage system including a plurality of storage battery strings connected in parallel to one another. The storage battery string includes a plurality of storage batteries connected in series. The storage battery connection control device includes a plurality of storage battery connection modules provided respectively for the storage battery strings, a plurality of first control devices provided respectively for the storage battery strings, and a second control device communicably connected to the plurality of the first control devices and configured to set charge and discharge power values or charge and discharge current values of the storage battery string. The storage battery connection module includes a power line that connects the plurality of storage batteries in series, a bypass circuit that bypasses the storage battery, and a power converter that converts input and output power of the storage battery string, the first control device or the second control device controls the power converter of the corresponding storage battery string according to the charge and discharge power values or the charge and discharge current values of the storage battery string set by the second control device. The second control device acquires information on states of the plurality of storage battery strings, and transmits bypass control information for controlling the bypass circuit to the first control device based on the information, and the first control device controls the bypass circuit of the corresponding storage battery string according to the bypass control information transmitted from the second control device.

According to the present invention, processing capacity can be ensured even in a large-scale power storage system, and cooperative control among the storage battery strings can be implemented.

DESCRIPTION OF EMBODIMENTS

Figure 1:
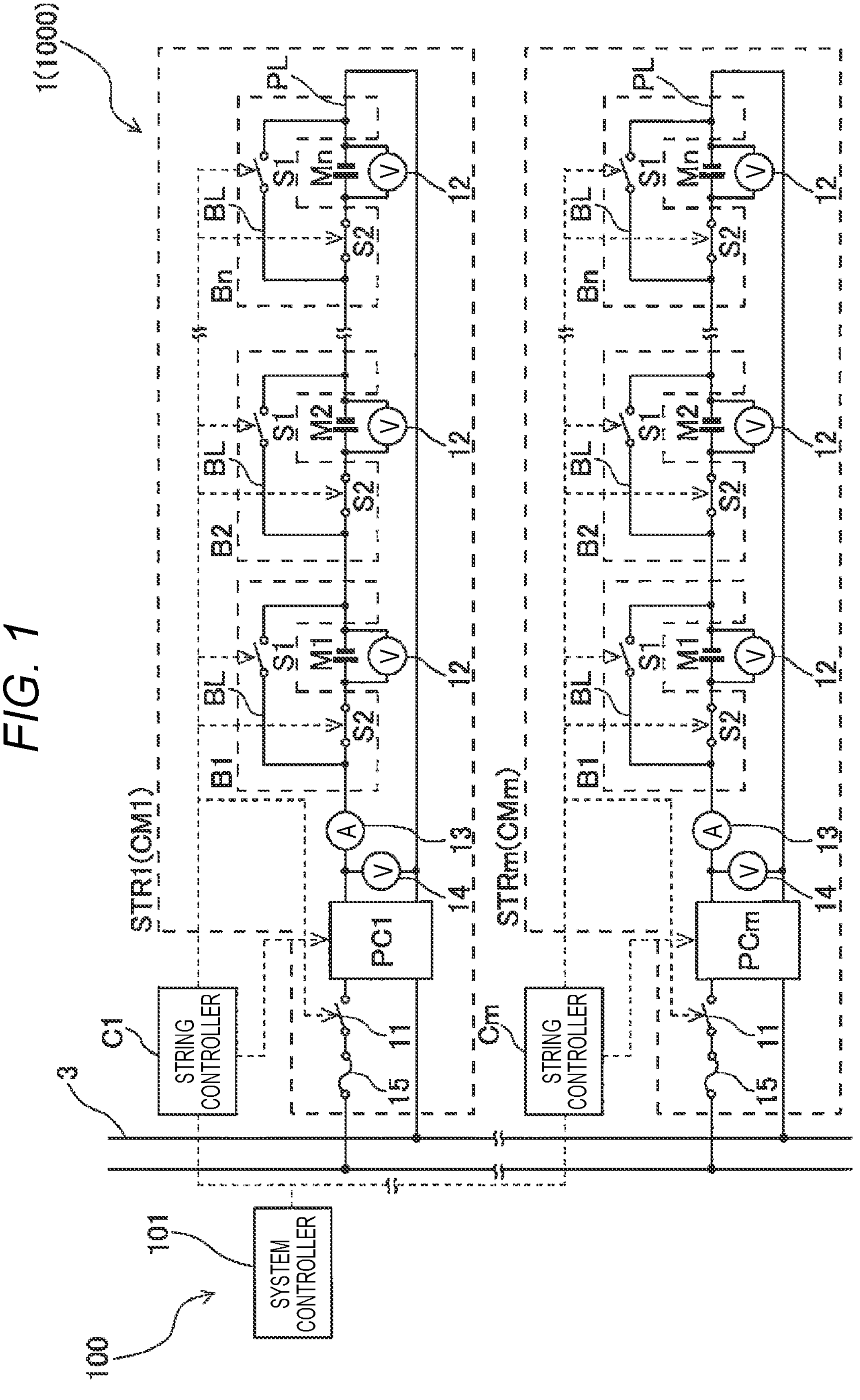
FIG. 1 is a circuit diagram schematically showing a power storage system including a storage battery control device and a storage battery connection control device according to an embodiment of the present invention.

Hereinafter, the present invention will be described with reference to preferred embodiments. The present invention is not limited to the embodiments to be described below, and the embodiments can be appropriately modified without departing from the scope of the present invention. In the embodiments to be described below, a part of configurations may be not described or shown in the drawings, and regarding details of the omitted techniques, publicly known or well-known techniques will be appropriately applied as long as there is no contradiction with the contents to be described below.

FIG. 1 is a circuit diagram schematically showing a power storage system 1 including a storage battery control device 100 and a storage battery connection control device 1000 according to an embodiment of the present invention. As shown in this drawing, the power storage system 1 includes m sets (m is an integer of 2 or more) of storage battery strings STR1 to STRm, a string bus 3, and the storage battery control device 100. The m sets of storage battery strings STR1 to STRm are connected in parallel to one another and are connected together to an external system (not shown) via the string bus 3. The power storage system 1 is a stationary or in-vehicle power supply.

Each of the storage battery strings STR1 to STRm include n (n is an integer of 2 or more) storage battery modules M1 to Mn connected in series. Although not particularly limited, the storage battery strings STR1 to STRm according to the present embodiment are obtained by remanufacturing used storage batteries, and the storage battery modules M1 to Mn differ in deterioration degree. The storage battery modules M1 to Mn are formed by connecting a plurality of secondary battery cells such as lithium ion batteries and lithium ion capacitors.

The storage battery modules M1 to Mn are charged with power supplied from the external system through the string bus 3 and power converters PC1 to PCm to be described later. The storage battery modules M1 to Mn supply power to the external system through the power converters PC1 to PCm and the string bus 3.

The external system includes a load, a generator, and the like. When the power storage system 1 is for stationary use, a household appliance, a commercial power supply system, a liquid crystal display, a communication module, and the like serve as loads, and a solar power generation system and the like serve as generators. On the other hand, when the power storage system 1 is for in-vehicle use, a driving motor, an air conditioner, various in-vehicle electrical components, and the like serve as loads. The driving motor serves as a load and also as a generator.

Each of the storage battery strings STR1 to STRm may include n storage battery cells or storage battery packs connected in series instead of the n storage battery modules M1 to Mn connected in series. The power storage system 1 may include a bypass circuit that bypasses each storage battery cell or each storage battery pack.

Each of the storage battery strings STR1 to STRm includes one of power converters PC1 to PCm, one string disconnection switch 11, and n bypass switch units B1 to Bn. Each of the storage battery strings STR1 to STRm includes n voltage sensors 12, one current sensor 13, one voltage sensor 14, one fuse 15, n temperature sensors (not shown), and a large number of cell voltage sensors (not shown).

The power converters PC1 to PCm are DC/DC converters or DC/AC converters, and are connected to the string bus 3. A positive electrode of the storage battery module M1 at a start end and a negative electrode of the storage battery module Mn at a terminal end are connected to each of the power converters PC1 to PCm.

When the storage battery strings STR1 to STRm are charged, each of the power converters PC1 to PCm converts a voltage input from the string bus 3 according to a charge power value or a charge current value to be described later and outputs the converted voltage to the plurality of storage battery modules M1 to Mn. Here, a voltage on a side of each of the storage battery strings STR1 to STRm changes due to a bypass state of the storage battery modules M1 to Mn (the number of bypassed storage battery modules M1 to Mn) and a charge state of the storage battery modules M1 to Mn. Therefore, when the storage battery strings STR1 to STRm are charged, each of the power converters PC1 to PCm converts the voltage input from the string bus 3 into the voltage on the side of each of the storage battery strings STR1 to STRm and outputs the converted voltage to the plurality of storage battery modules M1 to Mn.

When the storage battery strings STR1 to STRm are discharged, each of the power converters PC1 to PCm converts a voltage input from the plurality of storage battery modules M1 to Mn according to a discharge power value or a discharge current value to be described later and outputs the converted voltage to the string bus 3. Here, the voltage input to each of the power converters PC1 to PCm during discharge changes due to a bypass state of the storage battery modules M1 to Mn and a charge state of the storage battery modules M1 to Mn. Accordingly, voltages input to the power converters PC1 to PCm vary among the storage battery strings STR1 to STRm during discharge. Therefore, when the storage battery strings STR1 to STRm are discharged, each of the power converters PC1 to PCm converts the input voltage into a voltage matching the other storage battery strings STR1 to STRm and outputs the converted voltage to the string bus 3.

When a current flowing through the string bus 3 is a direct current, the power converters PC1 to PCm are DC/DC converters, and when the current flowing through the string bus 3 is an alternating current, the power converters PC1 to PCm are DC/AC converters. When the current flowing through the string bus 3 is the alternating current, each of the power converters PC1 to PCm is provided with a synchronization unit that follows a change in an instantaneous value.

The string disconnection switch 11 is provided between each of the power converters PC1 to PCm and the string bus 3. The string disconnection switch 11 connects each of the storage battery strings STR1 to STRm to the string bus 3 or disconnects each of the storage battery strings STR1 to STRm from the string bus 3. The fuse 15 is a power fuse provided between the string disconnection switch 11 and the string bus 3.

The voltage sensor 12 is connected between positive and negative electrode terminals of each of the storage battery modules M1 to Mn, detects a voltage between the terminals of each of the storage battery modules M1 to Mn, and transmits a detection signal to each of string controllers C1 to Cm to be described later. The current sensor 13 is provided on a power line PL of each of the storage battery strings STR1 to STRm, detects charge and discharge currents of each of the storage battery strings STR1 to STRm, and transmits detection signals to each of the string controllers C1 to Cm. The voltage sensor 14 is provided on the power line PL of each of the storage battery strings STR1 to STRm, detects a voltage of each of the storage battery strings STR1 to STRm, and transmits a detection signal to each of the string controllers C1 to Cm. A temperature sensor is provided for each of the storage battery modules M1 to Mn, detects a temperature of each of the storage battery modules M1 to Mn, and transmits a detection signal to each of the string controllers C1 to Cm. Further, a cell voltage sensor is provided for each storage battery cell of each of the storage battery modules M1 to Mn, detects a voltage of the storage battery cell, and transmits a detection signal to each of the string controllers C1 to Cm.

The bypass switch units B1 to Bn are provided respectively for the storage battery modules M1 to Mn. Each of the bypass switch units B1 to Bn includes a bypass line BL and switches S1 and S2. The bypass line BL is a power line that bypasses each of the storage battery modules M1 to Mn. The switch S1 is provided on the bypass line BL. The switch S1 is, for example, a mechanical relay or a semiconductor switch. The switch S2 is provided between a positive electrode of each of the storage battery modules M1 to Mn and one end of the bypass line BL. The switch S2 is, for example, a mechanical relay or a semiconductor switch.

The storage battery module M1 at the start end and the storage battery module Mn at the terminal end are connected to the external system via each of the power converters PC1 to PCm and the string bus 3. When the switch S1 is turned off and the switch S2 is turned on in all the bypass switch units B1 to Bn, all the storage battery modules M1 to Mn are connected in series to the external system. On the other hand, when the switch S2 is turned off and the switch S1 is turned on in any one of the bypass switch units B1 to Bn, the storage battery modules M1 to Mn corresponding to the bypass switch units B1 to Bn are bypassed.

The storage battery connection control device 1000 includes m sets of storage battery connection modules CM1 to CMm and the storage battery control device 100. The storage battery connection modules CM1 to CMm are provided respectively for the storage battery strings STR1 to STRm, and each connects the plurality of storage battery modules M1 to Mn of the corresponding one of the storage battery strings STR1 to STRm in series.

Each of the storage battery connection modules CM1 to CMm includes the power line PL that connects the plurality of storage battery modules M1 to Mn in series, one of the power converter PC1 to PCm, one string disconnection switch 11, and n bypass switch units B1 to Bn. Each of the storage battery connection modules CM1 to CMm includes n voltage sensors 12, one current sensor 13, one voltage sensor 14, one fuse 15, n temperature sensors, and a large number of cell voltage sensors.

The storage battery control device 100 includes m string controllers C1 to Cm and one system controller 101. The string controllers C1 to Cm are provided respectively for the storage battery strings STR1 to STRm.

Each of the string controllers C1 to Cm controls the switches S1 and S2 of the bypass switch units B1 to Bn, and the string disconnection switch 11, of the corresponding one of the storage battery strings STR1 to STRm. The string controllers C1 to Cm respectively control the power converters PC1 to PCm of the corresponding storage battery strings STR1 to STRm. The power converters PC1 to PCm convert charge and discharge voltages of the storage battery strings STR1 to STRm according to control signals transmitted from the corresponding string controllers C1 to Cm.

The string controllers C1 to Cm detect states of the corresponding storage battery strings STR1 to STRm, estimate the states of the corresponding storage battery strings STR1 to STRm, and notify the system controller 101 of device control requests. Examples of detection of the states of the storage battery strings STR1 to STRm include detection of charge and discharge currents of the storage battery strings STR1 to STRm based on detection signals of the current sensors 13, detection of voltages of the storage battery strings STR1 to STRm based on detection signals of the voltage sensors 14, detection of voltages of the storage battery modules M1 to Mn based on detection signals of the voltage sensors 12, detection of temperatures of the storage battery modules M1 to Mn based on detection signals from the temperature sensors, and detection of voltages of the storage battery cells based on detection signals of the cell voltage sensors. Examples of estimation of the states of the storage battery strings STR1 to STRm include estimation of states of charge (SOCs) and states of health (SOHs) of the storage battery modules M1 to Mn, and estimation of SOCs of the storage battery strings STR1 to STRm. Further, examples of notification of the device control requests to the system controller 101 includes notification of a request for switching control on the string disconnection switches 11 and the switches S1 and S2 of the bypass switch units B1 to Bn, and notification of a request for control on the power converters PC1 to PCm.

Examples of a method for estimating the SOH include a method based on a charge and discharge test, a method based on a current integration method, a method based on measurement of an open circuit voltage, a method based on measurement of a terminal voltage, a method based on a model (the above is a method using a temporal change in SOC), a method based on AC impedance measurement, a method for obtaining using an adaptive digital filter based on a model, a method by linear regression (an inclination of a straight line of I-V characteristics) based on I-V characteristics (current-voltage characteristics), and a method based on a step response (the above is a method for estimating using a temporal increase in internal resistance).

Examples of a method for estimating the SOC include various known methods such as a current integration method, a method for obtaining based on an open circuit voltage (OCV) (voltage method), and a method combining the current integration method and the voltage method. The OCV can be estimated using various known methods for estimating using a temporal change in terminal voltage or a temporal increase in internal resistance.

The system controller 101 is a controller that integrally controls the entire power storage system 1, and performs 1: m communication with the m string controllers C1 to Cm. The system controller 101 monitors the states of the storage battery strings STR1 to STRm, determines whether to permit the device control requests from the string controllers C1 to Cm, and notifies the string controllers C1 to Cm of permission for the device control requests. The system controller 101 sets charge and discharge power values (charge power values and discharge power values) or charge and discharge current values (charge current values and discharge current values) of the storage battery strings STR1 to STRm, and transmits the charge and discharge power values or the charge and discharge current values to the string controllers C1 to Cm.

The system controller 101 monitors the states of the storage battery strings STR1 to STRm based on detection results and estimation results of the states of the storage battery strings STR1 to STRm transmitted from the string controllers C1 to Cm. Then, the system controller 101 calculates the charge and discharge power values or the charge and discharge current values of the storage battery strings STR1 to STRm according to an instruction for charge and discharge power or charge and discharge currents of the entire power storage system 1 from a host controller (not shown). At this time, the system controller 101 calculates the charge and discharge power values or the charge and discharge current values of the storage battery strings STR1 to STRm according to the monitored states of the storage battery strings STR1 to STRm. For example, the string controllers C1 to Cm calculate limit values of charge and discharge currents based on the SOC and the OCV of the storage battery modules M1 to Mn and transmit the limit values to the system controller 101. Then, the system controller 101 calculates the charge and discharge currents of the storage battery strings STR1 to STRm corresponding to the string controllers C1 to Cm so as to be lower than the charge and discharge current limit values transmitted from the string controllers C1 to Cm.

The system controller 101 determines whether to respond to the device control requests from the string controllers C1 to Cm according to the monitored states of the other storage battery strings STR1 to STRm. For example, it is conceivable that a bypass control request is transmitted from a certain one of the string controllers C1 to Cm in a situation where the charge and discharge power of the other storage battery strings STR1 to STRm is limited to be small due to current limitation. In such a situation, the system controller 101 may reject the control request in order to ensure the charge and discharge power required for the power storage system 1.

When the device control requests from the string controllers C1 to Cm are permitted, the system controller 101 transmits a notification of permission for the control requests to the string controllers C1 to Cm. The string controllers C1 to Cm receiving the notification of permission for the control requests for the bypass switch units B1 to Bn and the string disconnection switches 11 execute switching control on the bypass switch units B1 to Bn and the string disconnection switches 11. The string controllers C1 to Cm receiving the notification of permission for the control requests for the power converters PC1 to PCm control the corresponding power converters PC1 to PCm.

In a situation where the device control request is not transmitted from a certain one of the string controllers C1 to Cm, the system controller 101 may transmit a device control instruction to the one of the string controllers C1 to Cm as necessary. For example, while the charge and discharge power of the other storage battery strings STR1 to STRm is limited due to the current limitation, the storage battery strings STR1 to STRm corresponding to the string controllers C1 to Cm that do not transmit the device control requests may be disconnected by the string disconnection switches 11. In such a situation, the system controller 101 may transmit a control instruction for switching the string disconnection switches 11 from off to on to the string controllers C1 to Cm that do not transmit the device control requests in order to ensure the charge and discharge currents required for the power storage system 1.

When detecting an abnormality in the storage battery strings STR1 to STRm, the string controllers C1 to Cm disconnect the string disconnection switches 11 regardless of presence or absence of a notification of control permission or a control instruction from the system controller 101.

As described above, the storage battery control device 100 according to the present embodiment includes a plurality of (m) string controllers C1 to Cm provided respectively for the storage battery strings STR1 to STRm, and the system controller 101 communicably connected to the plurality of string controllers C1 to Cm.

The system controller 101 executes the following processing (1) to (3). (1) Processing of setting charge and discharge power values or charge and discharge current values of the storage battery strings STR1 to STRm, (2) processing of acquiring, from the m string controllers C1 to Cm, detection information and estimation information on states of the m sets of storage battery strings STR1 to STRm, and (3) processing of determine whether to permit control requests for the bypass switch units B1 to Bn based on the acquired detection information and estimation information on the states of the m sets of storage battery strings STR1 to STRm, and transmitting a notification of permission for the control requests to the string controllers C1 to Cm.

On the other hand, the string controllers C1 to Cm execute the following processing (4) to (6). (4) Processing of detecting and estimating the states of the storage battery strings STR1 to STRm and transmitting the detection information and estimation information to the system controller 101, (5) processing of controlling the power converters PC1 to PCm of the corresponding storage battery strings STR1 to STRm according to the charge and discharge power values or the charge and discharge current values of the storage battery strings STR1 to STRm set by the system controller 101, and (6) processing of controlling the bypass switch units B1 to Bn of the corresponding storage battery strings STR1 to STRm according to the notification of permission for the control requests for the bypass switch units B1 to Bn transmitted from the system controller 101.

That is, in the storage battery control device 100 according to the present embodiment, processing is shared by the system controller 101 and the string controllers C1 to Cm. Thereby, excessive concentration of a processing load on the system controller 101 can be prevented. Therefore, even in the large-scale power storage system 1 including a large number of storage battery strings STR1 to STRm and a large number of bypass switch units B1 to Bn, processing capability of the storage battery control device 100 can be ensured.

The system controller 101 acquires information on the states of the m sets of storage battery strings STR1 to STRm from the m string controllers C1 to Cm, and determines whether to permit the control requests for the bypass switch units B1 to Bn based on the information. Accordingly, cooperative control on the bypass switch units B1 to Bn of the plurality of storage battery strings STR1 to STRm can be implemented.

In the storage battery control device 100 according to the present embodiment, the string controllers C1 to Cm execute the following processing (7), and the system controller 101 executes the above processing (2) and (3). Thereby, the processing load on the system controller 101 can be reduced. (7) Processing of acquiring information on the states of the storage battery strings STR1 to STRm (currents and the like of the storage battery strings STR1 to STRm) from sensors (current sensors 13 and the like) provided in the storage battery strings STR1 to STRm.

In the storage battery control device 100 according to the present embodiment, the string controllers C1 to Cm execute the following processing (8), and the system controller 101 executes the above processing (2) and (3). Thereby, the processing load on the system controller 101 can be reduced. (8) Processing of estimating information on the states of the storage battery strings STR1 to STRm (SOCs, OCVs, and the like of the storage battery modules M1 to Mn) based on detection information of sensors (voltage sensors 12, current sensors 13, and the like) provided in the storage battery strings STR1 to STRm, and transmitting the estimated information to the system controller 101.

In the storage battery control device 100 according to the present embodiment, the string controllers C1 to Cm execute the following processing (9). Thereby, the processing load on the system controller 101 can be reduced. (9) Processing of controlling the string disconnection switches 11 of storage battery strings STR1 to STRm Next, another embodiment of the storage battery control device 100 will be described. A circuit configuration of the power storage system 1 is the same as the above-described circuit configuration, and is shown in FIG. 1. The storage battery control device 100 according to the present embodiment includes m string controllers C1 to Cm provided respectively for the storage battery strings STR1 to STRm and one system controller 101 as in the above-described embodiment.

The string controllers C1 to Cm control the switches S1 and S2 of the bypass switch units B1 to Bn, the string disconnection switches 11, and the power converters PC1 to PCm of the corresponding storage battery strings STR1 to STRm. The power converters PC1 to PCm convert charge and discharge voltages of the storage battery strings STR1 to STRm according to control signals transmitted from the corresponding string controllers C1 to Cm.

The string controllers C1 to Cm detect and estimate states of the corresponding storage battery strings STR1 to STRm. Here, the string controllers C1 to Cm are different from those according to the above-described embodiment in that the string controllers C1 to Cm do not notify the system controller 101 of device control requests.

Similarly to the above-described embodiment, the system controller 101 is a controller that integrally controls the entire power storage system 1, and performs 1: m communication with the m string controllers C1 to Cm. The system controller 101 monitors the states of the storage battery strings STR1 to STRm, sets charge and discharge power values or charge and discharge current values of the storage battery strings STR1 to STRm, and transmits the charge and discharge power values or the charge and discharge current values to the string controllers C1 to Cm.

Here, the system controller 101 does not determine whether to permit the device control requests from the string controllers C1 to Cm, and does not notify the string controllers C1 to Cm of permission for the device control requests. Instead, the system controller 101 transmits a control instruction for controlling devices of the storage battery strings STR1 to STRm to the string controllers C1 to Cm. The devices of the storage battery strings STR1 to STRm include the bypass switch units B1 to Bn, the string disconnection switches 11, and the power converters PC1 to PCm.

Similarly to the above-described embodiment, the system controller 101 monitors the states of the m sets of storage battery strings STR1 to STRm based on detection results and estimation results of the states of the m sets of storage battery strings STR1 to STRm transmitted from the string controllers C1 to Cm. Then, similarly to the above-described embodiment, the system controller 101 calculates the charge and discharge power values or the charge and discharge current values of the storage battery strings STR1 to STRm according to an instruction for charge and discharge power or charge and discharge currents of the entire power storage system 1 from a host controller (not shown).

The system controller 101 generates an instruction for controlling the devices of the storage battery strings STR1 to STRm according to the states of the other storage battery strings STR1 to STRm and transmits the instruction to the corresponding string controllers C1 to Cm. For example, it is conceivable to transmit an instruction for controlling the devices of a certain one of the storage battery strings STR1 to STRm in a situation where charge and discharge power of the other storage battery strings STR1 to STRm is limited to be small due to current limitation. In such a situation, the system controller 101 may transmit a control instruction to minimize the number of bypasses of the storage battery modules M1 to Mn in order to ensure the charge and discharge power required for the power storage system 1.

The string controllers C1 to Cm receiving the control instruction for the bypass switch units B1 to Bn and the string disconnection switches 11 execute switching control on the string disconnection switches 11 and the switches S1 and S2 of the bypass switch units B1 to Bn. The string controllers C1 to Cm receiving a notification of the control instruction for the power converters PC1 to PCm control the power converters PC1 to PCm.

When detecting an abnormality in the storage battery strings STR1 to STRm, the string controllers C1 to Cm disconnect the string disconnection switches 11 regardless of presence or absence of a control instruction from the system controller 101.

As described above, the storage battery control device 100 according to the present embodiment includes a plurality of (m) string controllers C1 to Cm provided respectively for the storage battery strings STR1 to STRm, and the system controller 101 communicably connected to the plurality of string controllers C1 to Cm.

The system controller 101 executes the following processing (10) to (12). (10) Processing of setting charge and discharge power values or charge and discharge current values of the storage battery strings STR1 to STRm, (11) processing of acquiring, from the string controllers C1 to Cm, detection information and estimation information on states of the m sets of storage battery strings STR1 to STRm, and (12) processing of generating a control instruction for the bypass switch units B1 to Bn based on the acquired detection information and estimation information on the states of the m sets of storage battery strings STR1 to STRm, and transmitting the control instruction to the string controllers C1 to Cm.

On the other hand, the string controllers C1 to Cm execute the following processing (13) to (15). (13) Processing of detecting and estimating the states of the storage battery strings STR1 to STRm and transmitting the detection information and estimation information to the system controller 101, (14) processing of controlling the power converters PC1 to PCm of the corresponding storage battery strings STR1 to STRm according to the charge and discharge power values or the charge and discharge current values of the storage battery strings STR1 to STRm set by the system controller 101, and (15) processing of controlling the bypass switch units B1 to Bn of the corresponding storage battery strings STR1 to STRm according to the control instruction for the bypass switch units B1 to Bn transmitted from the system controller 101.

That is, in the storage battery control device 100 according to the present embodiment, processing is shared by the system controller 101 and the string controllers C1 to Cm. Thereby, excessive concentration of a processing load on the system controller 101 can be prevented. Therefore, even in the large-scale power storage system 1 including a large number of storage battery strings STR1 to STRm and a large number of bypass switch units B1 to Bn, processing capability of the storage battery control device 100 can be ensured.

The system controller 101 acquires information on the states of the storage battery strings STR1 to STRm from the string controllers C1 to Cm, generates a control instruction for the bypass switch units B1 to Bn based on the information, and transmits the control instruction to the string controllers C1 to Cm. Accordingly, cooperative control on the bypass switch units B1 to Bn of the plurality of storage battery strings STR1 to STRm can be implemented.

Figure 2:
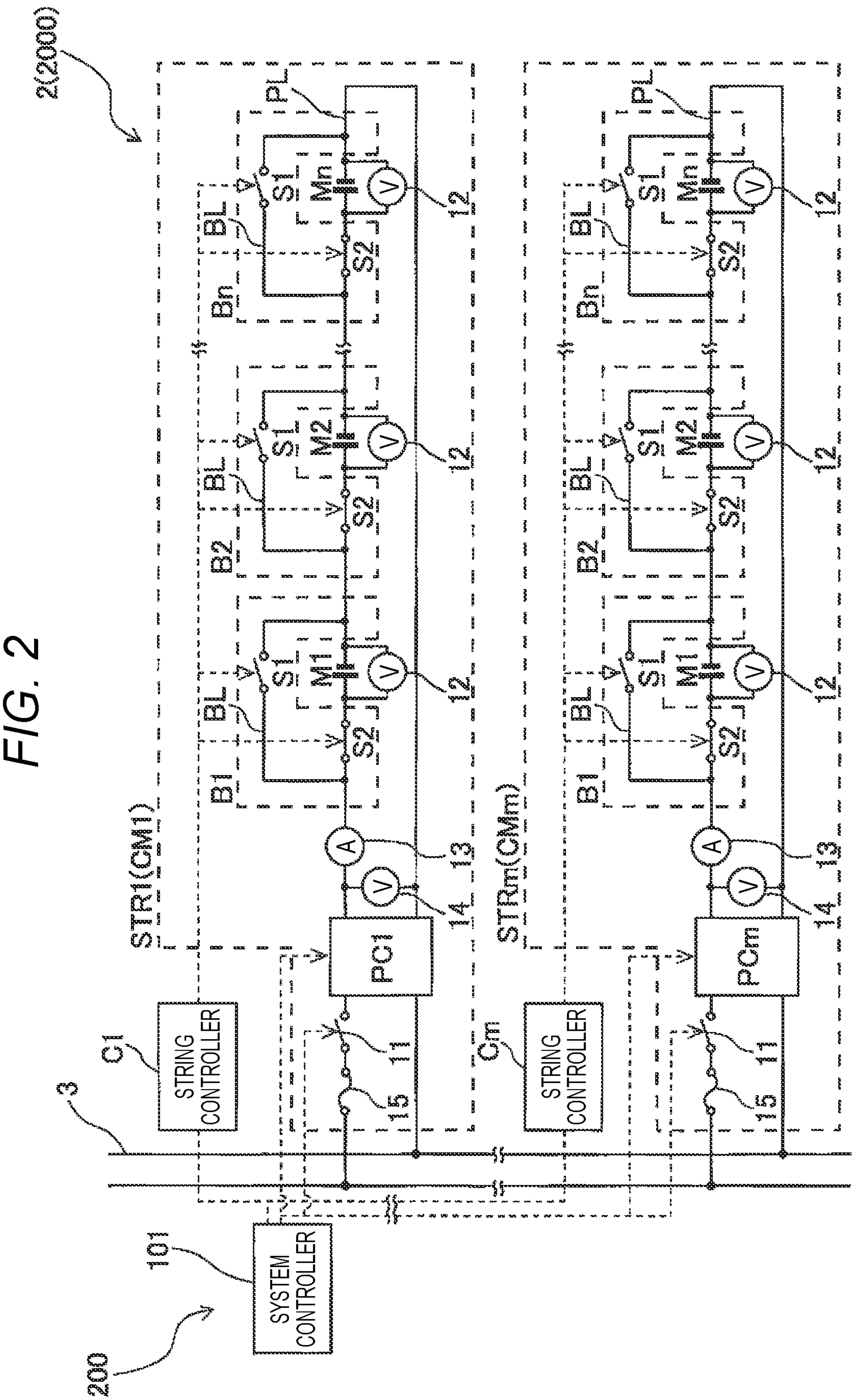
FIG. 2 is a circuit diagram schematically showing a power storage system including a storage battery control device and a storage battery connection control device according to another embodiment of the present invention.

FIG. 2 is a circuit diagram schematically showing a power storage system 2 including a storage battery control device 200 and a storage battery connection control device 2000 according to another embodiment of the present invention. As shown in this drawing, the storage battery connection control device 2000 includes m sets of storage battery connection modules CM1 to CMm and a storage battery control device 200. The storage battery connection modules CM1 to CMm are provided respectively for the storage battery strings STR1 to STRm, and each connects the plurality of storage battery modules M1 to Mn of the corresponding one of the storage battery strings STR1 to STRm in series.

In the power storage system 2 and the storage battery connection control device 2000 according to the present embodiment, devices of the storage battery strings STR1 to STRm controlled by the string controllers C1 to Cm are only the bypass switch units B1 to Bn. On the other hand, in the power storage system 2 and the storage battery connection control device 2000 according to the present embodiment, the system controller 101 controls the string disconnection switches 11 and the power converters PC1 to PCm.

The string controllers C1 to Cm control the switches S1 and S2 of the corresponding bypass switch units B1 to Bn.

The system controller 101 transmits a control signal to the string disconnection switches 11 and the power converters PC1 to PCm of the storage battery strings STR1 to STRm. The string disconnection switch 11 is turned on or off according to the control signal transmitted from the system controller 101. The power converters PC1 to PCm convert charge and discharge voltages of the storage battery strings STR1 to STRm according to the control signal transmitted from the system controller 101.

Here, the string controllers C1 to Cm do not detect or estimate states of the storage battery strings STR1 to STRm. The string controllers C1 to Cm do not notify the system controller 101 of control requests either.

Similarly to the above-described embodiment, the system controller 101 is a controller that integrally controls the entire power storage system 2, and performs 1: m communication with the m string controllers C1 to Cm. The system controller 101 monitors the states of the storage battery strings STR1 to STRm and sets charge and discharge power values or charge and discharge current values of the storage battery strings STR1 to STRm. In addition, the system controller 101 detects the states of the storage battery strings STR1 to STRm and estimates the states of the storage battery strings STR1 to STRm.

The system controller 101 detects charge and discharge currents of each of the storage battery strings STR1 to STRm based on a detection signal from the current sensor 13. The system controller 101 detects a voltage of each of the storage battery strings STR1 to STRm based on a detection signal from the voltage sensor 14. The system controller 101 detects voltages of the storage battery modules M1 to Mn based on detection signals from the voltage sensors 12. The system controller 101 detects temperatures of the storage battery modules M1 to Mn based on detection signals from temperature sensors (not shown). Further, the system controller 101 detects voltages of storage battery cells based on detection signals from cell voltage sensors (not shown).

The system controller 101 estimates SOCs and SOHs of the storage battery modules M1 to Mn, estimates SOCs of the storage battery strings STR1 to STRm, and the like. Further, the system controller 101 generates a control instruction for controlling the switches S1 and S2 of the bypass switch units B1 to Bn and transmits the control instruction to the string controllers C1 to Cm.

As described above, the storage battery control device 200 according to the present embodiment includes a plurality of (m) string controllers C1 to Cm provided respectively for the storage battery strings STR1 to STRm, and the system controller 101 communicably connected to the plurality of string controllers C1 to Cm.

The system controller 101 executes the following processing (16) to (20). (16) Processing of setting charge and discharge power values or charge and discharge current values of the storage battery strings STR1 to STRm, (17) processing of detecting and estimating states of the m sets of storage battery strings STR1 to STRm, (18) processing of generating a control instruction for the bypass switch units B1 to Bn based on detection results and estimation results of the states of the m sets of storage battery strings STR1 to STRm, and transmitting the control instruction to the string controllers C1 to Cm, (19) processing of controlling the power converters PC1 to PCm of the corresponding storage battery strings STR1 to STRm according to the charge and discharge power values or the charge and discharge current values of the storage battery strings STR1 to STRm set by itself, and (20) processing of controlling the string disconnection switches 11 of the storage battery strings STR1 to STRm.

On the other hand, the string controllers C1 to Cm execute the following processing (21). (21) Processing of controlling the bypass switch units B1 to Bn of the corresponding storage battery strings STR1 to STRm according to the control instruction for the bypass switch units B1 to Bn transmitted from the system controller 101.

That is, in the storage battery control device 200 according to the present embodiment, processing is shared by the system controller 101 and the string controllers C1 to Cm. Thereby, excessive concentration of a processing load on the system controller 101 can be prevented. Therefore, even in the large-scale power storage system 1 including a large number of storage battery strings STR1 to STRm and a large number of bypass switch units B1 to Bn, processing capability of the storage battery control device 200 can be ensured.

The system controller 101 detects and estimates the states of the m sets of the storage battery strings STR1 to STRm, and transmits the control instruction for the bypass switch units B1 to Bn to the string controllers C1 to Cm based on the results. Accordingly, cooperative control on the bypass switch units B1 to Bn of the plurality of storage battery strings STR1 to STRm can be implemented.

Although the present invention has been described above based on the above-described embodiments, the present invention is not limited to the above-described embodiments, and modifications may be made without departing from the scope of the present invention, or publicly known or well-known techniques may be appropriately combined.

For example, sharing of processing by the system controller 101 and the string controllers C1 to Cm may be appropriately changed, such as letting the system controller 101 take charge. For example, the processing of detecting the states of the strings STR1 to STRm may be executed by the string controllers C1 to Cm, and the processing of estimating the states of the strings STR1 to STRm may be executed by the system controller 101. The string disconnection switches 11 may be controlled by the string controllers C1 to Cm, and the power converters PC1 to PCm may be controlled by the system controller 101.

What is claimed is:

1. A storage battery control device that controls a power storage system including a plurality of storage battery strings connected in parallel to one another, each of the storage battery strings including a plurality of storage batteries connected in series, a bypass circuit that is configured to bypass at least one storage battery of the plurality of storage batteries, and a power converter that converts input and output power of a respective one of the storage battery strings, the storage battery control device comprising:

a plurality of first control devices, each of the first control devices being provided for the respective one of the storage battery strings; and a second control device communicably connected to each of the first control devices and configured to set charge and discharge power values or charge and discharge current values for each of the storage battery strings, wherein each of the first control devices controls the power converter of the respective one of the storage battery strings according to the charge and discharge power values or the charge and discharge current values of the respective one of the storage battery strings set by the second control device, the second control device acquires information on states of each of the storage battery strings, and transmits bypass control information for controlling the bypass circuit of the respective one of the storage battery strings to a respective one of the first control devices based on the information, each of the first control devices determines whether to control the bypass circuit of the respective one of the storage battery strings based on information on a state of the respective one of the storage battery strings, and transmits a control request for the bypass circuit of the respective one of the storage battery strings to the second control device, and each of the first control devices controls the bypass circuit of the respective one of the storage battery strings according to the bypass control information transmitted from the second control device, the bypass control information including permission information for permitting the control request.

2. The storage battery control device according to claim 1, wherein the second control device determines whether to permit the control request transmitted from the respective one of the first control devices based on the acquired information on the states of the plurality of storage battery strings, and transmits the permission information for permitting the control request to the respective one of the first control devices.

3. The storage battery control device according to claim 1, wherein the second control device determines whether to control the bypass circuit of each of the storage battery strings based on the acquired information on the states of the plurality of storage battery strings, and transmits instruction information for instructing control on the bypass circuit of the respective one of the storage battery strings as the bypass control information to the respective one of the first control devices.

4. The storage battery control device according to claim 1, wherein information on a state of each of the storage battery strings includes at least one of a current of the respective one of the storage battery strings, a voltage of the respective one of the storage battery strings, a voltage of at least one of the storage batteries of the respective one of the storage battery strings, and a temperature of at least one of the storage batteries of the respective one of the storage battery strings, and is detected by a state detector provided in the respective one of the storage battery strings, each of the first control devices acquires the information on the state of the respective one of the storage battery strings from the state detector provided in the respective one of the storage battery strings and transmits the acquired information to the second control device, based on the information acquired from each of the plurality of first control devices, the second control device transmits the bypass control information to the respective one of the first control devices.

5. The storage battery control device according to claim 1, wherein information on a state of each of the storage battery strings includes at least one of a state of charge (SOC) of at least one of the storage batteries of the respective one of the storage battery strings, an open circuit voltage (OCV) of at least one of the storage batteries of the respective one of the storage battery strings battery, a state of health (SOH) of the storage batteries of the respective one of the storage battery strings, and a state of charge (SOC) of the respective one of the storage battery strings, each of the first control devices estimates the information on the state of the respective one of the storage battery strings based on detection information from a state detector provided in the respective one of the storage battery strings and transmits the estimated information to the second control device, and based on the information on the state of the storage battery strings acquired from each of the plurality of first control devices, the second control device transmits the bypass control information to the respective one of the first control devices.

6. The storage battery control device according to claim 1, wherein each of the first control devices controls the power converter of the respective one of the storage battery strings according to the charge and discharge power values or the charge and discharge current values of the respective one of the storage battery strings set by the second control device.

7. The storage battery control device according to claim 1, wherein the power storage system includes a plurality of string disconnection switches, each of the string disconnection switches being provided for the respective one of the storage battery strings and configured to disconnect the respective one of the storage battery strings, and each of the first control devices controls the a respective one of the string disconnection switches.

8. A storage battery connection control device for use in a power storage system including a plurality of storage battery strings connected in parallel to one another, each of the storage battery strings including a plurality of storage batteries connected in series, the storage battery connection control device comprising:

a plurality of storage battery connection modules, each of the storage battery connection modules being provided for a respective one of the storage battery strings;

a plurality of first control devices, each of the first control devices being provided for the respective of the storage battery strings; and a second control device communicably connected to each of the first control devices and configured to set charge and discharge power values or charge and discharge current values for each of the storage battery strings, wherein each of the storage battery connection modules includes a power line that connects the plurality of storage batteries in series of the respective one of the storage battery strings, a bypass circuit that bypasses at least one of the storage batteries of the respective one of the storage battery strings, and a power converter that converts input and output power of the respective one of the storage battery strings, each of the first control devices controls the power converter of the respective one of the storage battery strings according to the charge and discharge power values or the charge and discharge current values of the respective one of the storage battery strings set by the second control device, the second control device acquires information on states of each of the storage battery strings, and transmits bypass control information for controlling the bypass circuit to a respective one of the first control devices based on the information, each of the first control devices determines whether to control the bypass circuit of the respective one of the storage battery strings based on information on a state of the respective one of the storage battery strings, and transmits a control request for the bypass circuit of the respective one of the storage battery strings to the second control device, and each of the first control devices controls the bypass circuit of the respective one of the storage battery strings according to the bypass control information transmitted from the second control device, the bypass information including permission information for permitting the control request.

9. A storage battery control device that controls a power storage system including a plurality of storage battery strings connected in parallel to one another, each of the storage battery strings including a plurality of storage batteries connected in series, a bypass circuit that is configured to bypass at least one storage battery of the plurality of storage batteries, and a power converter that converts input and output power of a respective one of the storage battery strings, the storage battery control device comprising:

a plurality of first control devices, each of the first control devices being provided for a respective one of the storage battery strings; and a second control device communicably connected to each of the first control devices and configured to set charge and discharge power values or charge and discharge current values for each of the storage battery strings, wherein the second control device controls the power converter of the respective one of the storage battery strings according to the charge and discharge power values or the charge and discharge current values of the respective one of the storage battery strings set by the second control device, the second control device acquires information on states of each of the storage battery strings, and transmits bypass control information for controlling the bypass circuit of the respective one of the storage battery strings to a respective one of the first control devices based on the information, each of the first control devices determines whether to control the bypass circuit of the respective one of the storage battery strings based on information on a state of the respective one of the storage battery strings, and transmits a control request for the bypass circuit of the respective one of the storage battery strings to the second control device, and each of the first control devices controls the bypass circuit of the respective one of the storage battery strings according to the bypass control information transmitted from the second control device, the bypass control information including permission information for permitting the control request.

* * * * *